Jan. 27, 1942.  T. W. BRIEGEL ET AL  2,270,926
FITTING
Filed June 22, 1940 2 Sheets-Sheet 1
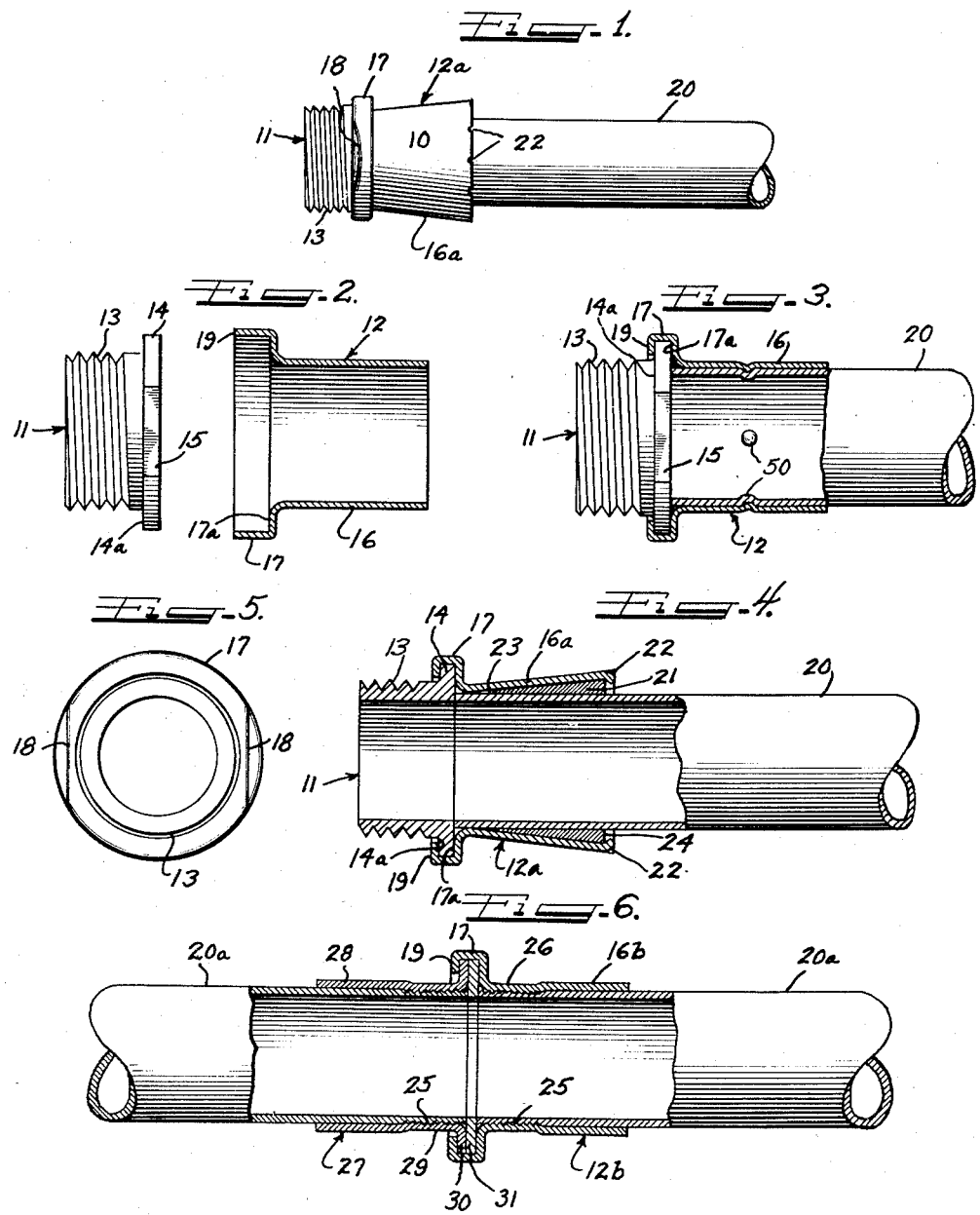
Inventors
THEODORE W. BRIEGEL
RAY W. ASBURY Jan. 27, 1942.     T. W. BRIEGEL ET AL     2,270,926
FITTING
Filed June 22, 1940     2 Sheets-Sheet 2
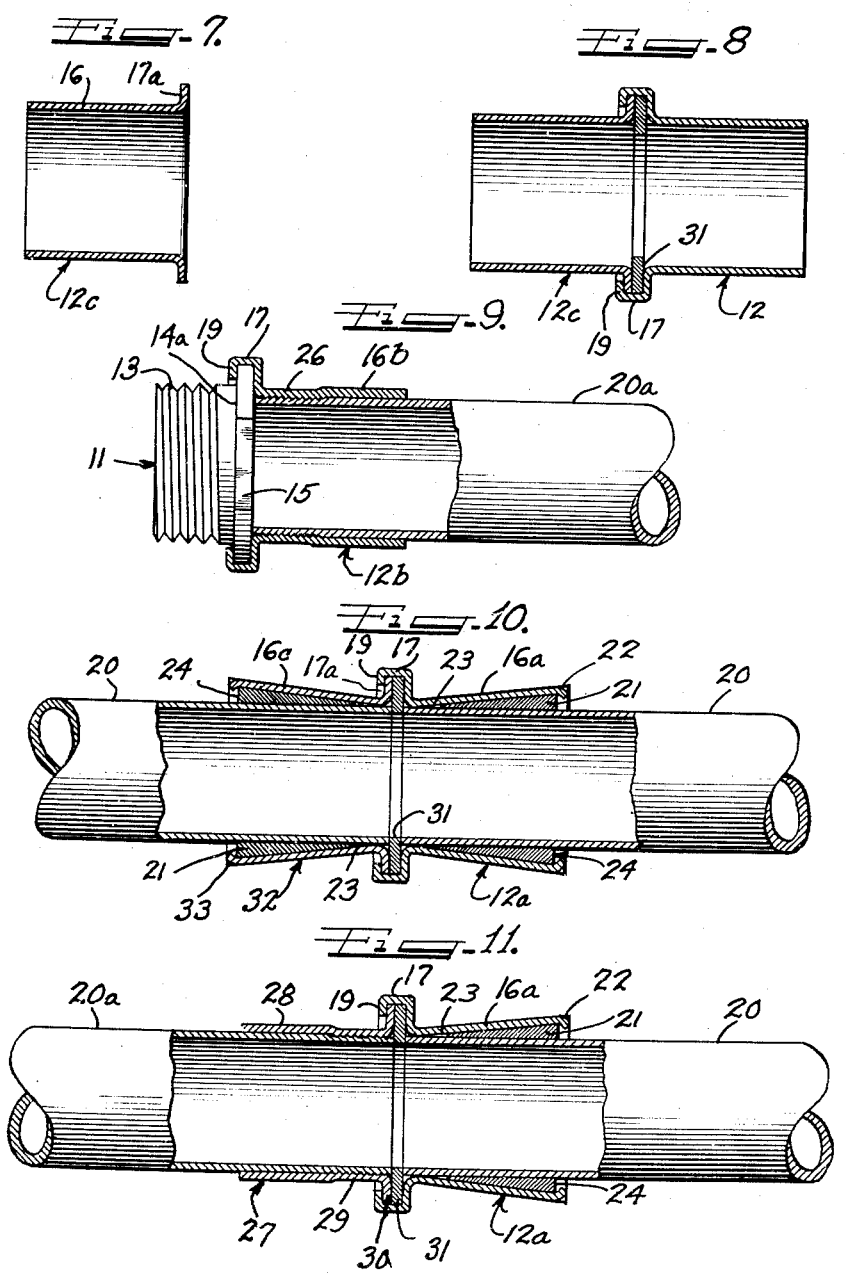

Patented Jan. 27, 1942

2,270,926

UNITED STATES PATENT OFFICE 2,270,926

FITTING

Theodore W. Briegel and Ray W. Asbury,
Galva, Ill.

Application June 22, 1940, Serial No. 341,836

2 Claims. (Cl. 285—193)

This invention relates to a coupling fitting and to a method of assembling the same on tubes, pipes and like conduits. More particularly the invention relates to a fitting comprising one or more members formed of drawn sheet metal and to a method for assembling the members of the fitting.

It has heretofore been customary in connecting thin walled electrical conduits to an apertured member, such as an outlet box, or in coupling together the ends of thin walled conduits and the like, to provide a flange at the end of the tubing for abutment against a threaded end of a cast or machined fitting, the abutment being maintained in place by an interiorly threaded nut embracing the flanged end of the tubing and threaded to the end of the fitting. Other arrangements include contracting an expansion ring around the flanged tubing or in using a split compression ring for embracing the flanged tubing. In either case the flange or expanded portion of the tubing or the compression ring is clamped to a threaded body by means of an interiorly threaded shoulder nut. Such an arrangement is not only unsightly and relatively expensive to manufacture but also requires that the end of the tubing be flanged outwardly before it can be properly connected.

Similarly, in connecting together the ends of conduits, it has been customary to flange their ends and maintain the flanges in abutment by a nut threadedly embracing half-portions of a fitting, both portions being exteriorly threaded with right-hand threads.

It is, therefore, an important object of this invention to provide a connecting fitting of simple construction largely or wholly formed of inexpensive, drawn sheet metal, easy to assemble in place, and imparting a pleasingly balanced appearance when coupled to thin walled tubes and like conduits.

It is a further important object of this invention to provide a flanged sheet metal fitting for mounting on a smooth unflanged end of thin walled tubing or for coupling together the conduits.

Another important object of this invention is to provide a flanged compression type fitting of simple, inexpensive sheet metal construction for mounting on the smooth end of thin walled tubing and like conduits.

A still further object of the present invention is to provide a two-part flanged sheet metal fitting for coupling together the ends of unflanged thin walled tubes and like conduits.

Another important object of the present invention is to provide a simple method of connecting together the unflanged ends of thin walled tubing and like conduits.

Another and still further object of this invention is the provision of a pair of stamped or drawn sheet metal members so constructed as to form a coupling member, and each of which, with minor changes capable of being made on the job, are capable of forming numerous forms of couplings or connectors.

The novel features believed to be characteristic of the present invention are set forth with particularity in the appended claims. The invention itself, however, both as to its organization and manner of construction, with further objects and advantages thereof, may best be understood by reference to the following description taken in connection with the accompanying drawings, in which:

Figure 1 is a plan view of a flanged fitting having a threaded end portion and a compression type end portion embodying the principles of the present invention and illustrating the fitting assembled on a conduit end;

Figure 2 is a plan view of the two fittings of this invention from which all modified forms are constructed, with the sheet metal tubular fitting in section, illustrating the exteriorly threaded flanged nipple and the tubular sheet metal fitting prior to assembly;

Figure 3 is a plan view, partly in section, of the parts illustrated in Figure 2 showing their relationship when assembled;

Figure 4 is an enlarged plan view, similar to Figure 1, partly broken away and in longitudinal cross-section, showing the relationship of parts when the compression type portion of the fitting is connected to a smooth end of a tubing;

Figure 5 is an end view in elevation of the assembly illustrated in Figure 4, and generally illustrates the contour of the flanged portion of the fitting of this invention;

Figure 6 is a view similar to Figure 4 illustrating a modified form of the fitting of this invention for connecting together the ends of smooth, thin walled tubing.

Figure 7 is a view, in longitudinal cross-section, of the tubular sheet metal fitting illustrated in Figure 2 after the peripheral portion of the enlarged flange has been cut away;

Figure 8 is a view similar to Figure 3 illustrating a coupling formed of the tubular sheet metal members shown in Figures 2 and 7;

Figure 9 is a view similar to Figure 4 illustrating a connector fitting formed of the nipple shown in Figure 2 and the threaded tubular sheet metal member shown in Figure 6;

Figure 10 is a view similar to Figure 6 illustrating a double compression type coupling fitting formed from the fitting shown in Figure 8; and, Figure 11 is a view similar to Figures 6 and 10, illustrating a coupling fitting formed from members shown therein.

The reference numeral 10 indicates generally one form of fitting embodying the principles of this invention and which is formed from the elements illustrated in Figure 2. The fitting consists of an exteriorly threaded nipple 11 and a tubular sheet metal member, which in its partially shaped condition is indicated by the reference numeral 12.

The nipple 11 is drawn from sheet metal or die formed from a tubular blank, to the contour illustrated. The nipple 11 is provided at one end with exterior threads 13 and at its other end terminates in an outwardly extending peripheral flange 14 having flat faces 15 on opposite sides thereof for a purpose to be more fully explained hereinafter. While opposite flat faces have been shown, it is to be understood that a single flat face or a plurality of such faces can be used equally as well. The threads 13 are provided for engaging the internal threads of an apertured member (not shown), such as an outlet box, to which a conduit is to be connected.

The drawn sheet metal member 12 of the fitting provides a tubular portion 16 terminating at one end in an enlarged tubular portion 17 having an inside diameter slightly less than the outside diameter of the flange 14 of the nipple 11.

As shown in Figure 3, the nipple flange 14 is pressed into the enlarged tubular end 17 of the sheet metal member 12 into abutment with the shoulder 17a. In this operation, the corners at the ends of the flat faces cut into the wall of the portion 17 while other metal is displaced and flows into the recess between each flat face and the inner periphery of the enlarged portion 17. The extended edge 19 of the enlarged tubular portion 17 is then spun over or peened against the inner face or shoulder 14a of the flange 14 by a die operation. As shown in Figure 5, this die operation forms slanting or tapering surfaces 18 on the portion 17 adjacent the flat faces 15 on the nipple. When looking at the coupling fitting illustrated in Figure 3 from the right, the enlarged portion 17 is round, but when looking at the coupling fitting from the left, the slanting surfaces 18 are visible. If desired, the nipple flange 14 may be welded within the enlarged portion 17.

It is to be noted from Figure 4 that the inside diameter of the nipple 11 is approximately equal to the inside diameter of an inserted tubing. This arrangement provides a uniform inside diameter throughout the assembly.

The assembled fitting illustrated in Figure 3 is adapted to receive in its tubular portion 16, by a slip fit, the smooth end of a tubing 20. Abutment between the end of the inserted tubing and the flange of the nipple 11 defines the limit of insertion within the tubular member 12. The tubing 20 is locked within the tubular portion 16 by the deforming indentations 50. If desired, and little or no pulling force is to be exerted on the tubing, then the tubing 20 may be inserted within the tubular portion by a press fit.

If it is desired that the sheet metal portion of the connector fitting of this invention be of the compression type then the fitting member 12a is shaped as illustrated in Figures 1 and 4. In this embodiment, the tubular end 16 is flared outwardly from the enlarged or flanged end 17 to provide a hollow conical portion 16a. A tapered wedge-shaped split sleeve 21 is inserted between the expanded conical end 16a and the inserted smooth end of the tubing 20.

Portions of the material of the flared end 16a are struck inwardly as at 22, to engage against the material of the wedge-shaped sleeve 21. Preferably, the sleeve 21 is shorter than the length of the flared portion 16a so as to leave a take-up space 23 at the inner end of the sleeve to permit the indented portions 22 to bear inwardly against the end edges 24 of the sleeve 21.

By this arrangement, when the indentations 22 are struck inwardly, the displacement of the material so indented bears against the end edges 24 of the sleeve 21 and forces the sleeve into even tighter wedging engagement, while at the same time permanently assembling the fitting upon the smooth end of the tubing 20. The frictional engagement between the contacting surfaces of the wedge-shaped sleeve 21 and of the smooth outer surfaces of the inserted tubing 20 is such that a very considerable pull would be necessary to separate the members, far in excess of any normal pull to which the thin walled tubing or conduit might be subjected during installation and use. It is to be noted that the walls of the flared portion 16a are sufficiently thin so that the indented portions 22 can be readily formed by a tool on the job.

In Figure 6 there is illustrated another modification of the fitting of this invention embodying the same principles as set forth above, but serving as a coupling fitting for the purpose of coupling the ends of thin walled tubings. In this modification, the tubing or conduits 20a, which are to be connected together, are provided with exteriorly threaded ends 25. The flanged sheet metal member 12b is shaped similar to the member 12 with the exception that an inner portion 26, on the tubular portion 16b and adjacent the enlarged or flanged portion 17, is left unexpanded and internally threaded to engage the threads 25 at the end of one of the tubes 20a. The outer end of the tubular portion 16b is cylindrically expanded to be of the same inside diameter as the outside diameter of the inserted tube 20a.

A tubular mating member 27 is provided with a cylindrically expanded end 28 of the same diameter as that of the end 16b of the member 12b and an unexpanded portion 29 interiorly threaded the same as the portion 26. At its inner end, the tubular member 27 is provided with an outwardly extending flange 30 having an outside diameter approximately equal to the inside diameter of the flange 17 on the tubular member 12b.

A flat spacing washer 31, having an outside diameter equal to that of the flange 30 and an inside diameter equal to that of the inserted tubes 20a, is inserted within and between the flanges 17 and 30. This washer serves as an abutment to limit the extent to which the conduits 20a can be threaded into the tubular members 12b and 27 inasmuch as the taper of the engaging threads may be such that the ends of the tubings 20a would not abut against each other if the washer was not used. The extended end 19 of the enlarged or flanged end 17 is spun over or peened by a die operation against the inside shoulder of the flange 30.

This assembly provides a connection for the ends of thin walled tubing and like conduits, and maintains a smooth inside bore at the connection. A flat face or faces may also be provided on the flange 30 or the washer 31 to effect the formation of tapered faces 18 on the enlarged tubular portion 17 in the same manner as previously described and for the purpose of tightly locking the flange connection to prevent relative rotative movement between the connected conduits 20a.

If a flat face or faces, such as 15, are provided on either the flange 30 or the washer 31 in a manner similar to that shown in Figure 2, then portions of the enlargement 17 adjacent thereto may be pressed into flat engagement therewith to provide gripping surfaces against which a wrench or other tool may engage for tightening the threaded connections.

In Figure 7 there is illustrated a drawn tubular sheet metal member 12c which is of exactly the same shape as the member 12 after the flange 17 has been cut away at the periphery of the shoulder 17a.

By assembling together the tubular members 12 (Figure 2) and 12c (Figure 7), and the washer 31, as shown in Figure 8, a coupling is provided into which is inserted, by press fits, the smooth ends of tubings such as 20.

In Figure 9 there is illustrated a connector fitting assembly formed by the nipple 11 (Figure 2) and the threaded tubular member 12b (Figure 6). The connector assembly is shown as threaded to a tubing 20a.

The double compression type coupling illustrated in Figure 10 is formed by the assembly of the flared tubular member 12a (Figure 4), the mating flared tubular member 32, and the washer 31. The fitting member 32 is formed from the drawn sheet metal tubular member 12c by flaring the tubular end 16 outwardly from its flanged end 17a to provide a hollow conical portion 16c.

The flared tubular members are connected in the same manner as described with reference to the assembly illustrated in Figure 6. When the smooth walled tubings 20 are inserted they are locked in place in exactly the same manner as described with reference to Figure 4. Both flared members are provided with wedge-shaped sleeves 21 which are maintained in wedging engagement by the indented portions 22 on the member 12a and the indented portions 33 on the member 32.

Figure 11 illustrates a coupling assembly formed from the threaded tubular member 27 (Figure 6) and the flared compression type member 12a (Figure 4). In this assembly the tubular members are arranged in flanged engagement in the same manner as previously described to connect the ends of the smooth walled tubing 20 and the threaded tubing 20a. This assembly provides a combined threaded and compression type coupling.

While a spacing or abutment washer 31 has been illustrated in several of the modifications, it is not necessary that it be used with the threaded tubular fittings inasmuch as the tapers of the threads will permit an abutment between the ends of the inserted tubings. However, where a press fit between the tubings and tubular fittings is provided, or where they are locked together as by deforming indentations, then it is necessary that a spacing washer be used. The assemblies requiring the use of a spacing washer are shown in Figures 8, 10 and 11.

From the foregoing description it will be noted that a coupling fitting has been provided of the threaded or compression type, capable of being secured on the end of a tubing, or for connecting together the ends of thin walled tubings, while maintaining a smooth, unbroken inner surface therethrough. The partially shaped tubular sheet metal member 12 may be converted into the conical type of fitting 12a (Figures 1 and 4) by simply driving a conically tapered arbor thereinto, or into a cylindrically expanded type of fitting 12b (Figure 6) by means of a cylindrical expanding arbor, or into the fitting members 12c, 27 and 32 by cutting off the flange 17 of either of the previously described fitting members. Thus, it is necessary to carry in stock only the partially shaped tubular member 12 for conversion into any one of the types of fittings described. It is to be further noted that from the fittings 11 and 12 every modified assembly of coupling or connector may be quickly and easily formed.

While particular embodiments of this invention have been illustrated, it will, of course, be understood that the invention should not be limited thereto, since many modifications may be made and, therefore, it is contemplated by the appended claims to cover all such modifications as fall within the true spirit and scope of the present invention.

We claim as our invention:

1. A fitting assembly comprising a drawn sheet metal nipple having a radially extending non-circular peripheral flange at one end thereof, a drawn sheet metal tubular member having an enlarged end portion of conforming non-circular shape providing an inner shoulder against which said flange abuts, said enlarged portion being deformed about the periphery of said flange to completely enclose and tightly engage the same, and a conduit extending into said tubular member into abutting relationship against the flange on said nipple.

2. A fitting assembly comprising a drawn sheet metal nipple having exterior threads at one end and a non-circular radially extending peripheral flange at the other end thereof, a drawn sheet metal tubular member having an enlarged end portion of circular shape providing an inner shoulder against which said flange abuts, said enlarged portion being deformed about the periphery of said flange to completely enclose and tightly engage the same and to provide tapered portions for preventing relative rotation between said members, and a conduit extending into said tubular member into abutting relationship against the flange on said nipple whereby the inside surfaces of said nipple and conduit are in flush relation.

THEODORE W. BRIEGEL.
RAY W. ASBURY.